United States Patent [19]

Barnes

[11] Patent Number: 5,153,410
[45] Date of Patent: Oct. 6, 1992

[54] METHOD AND APPARATUS FOR HEATING THE CYLINDER OF A VEHICLE DOOR LOCK UTILIZING TIMING MEANS

[75] Inventor: Donald D. Barnes, Seattle, Wash.

[73] Assignee: Paccar Inc., Bellevue, Wash.

[21] Appl. No.: 705,967

[22] Filed: May 28, 1991

[51] Int. Cl.⁵ .............................................. H05B 1/02
[52] U.S. Cl. .................... 219/201; 219/202; 70/431; 307/10.1; 307/141
[58] Field of Search ........................ 219/200, 201, 202; 70/431; 307/10.1, 141.4, 141

[56] References Cited

U.S. PATENT DOCUMENTS

| | | | |
|---|---|---|---|
| 2,232,577 | 2/1941 | West, Jr. | 70/431 |
| 2,371,534 | 3/1945 | McGrath | 219/19 |
| 2,390,475 | 12/1945 | Thomas | 219/19 |
| 2,530,513 | 11/1950 | Drugan | 219/19 |
| 2,538,872 | 1/1951 | Jones | 70/431 |
| 2,774,855 | 12/1956 | Simmons | 219/19 |
| 3,192,359 | 6/1965 | Swindall | 219/201 |
| 3,662,149 | 5/1972 | Lipinski | 219/201 |
| 4,349,722 | 9/1982 | Kurth et al. | 219/202 |
| 4,407,588 | 10/1983 | Arichi et al. | 368/118 |
| 4,442,341 | 4/1984 | Lesquereux et al. | 219/201 |
| 4,822,976 | 4/1989 | Buranathanit | 219/202 |
| 4,927,993 | 5/1990 | Simmons | 219/201 |

FOREIGN PATENT DOCUMENTS

| | | |
|---|---|---|
| 134985 | 7/1984 | European Pat. Off. |
| 2628150 | 1/1978 | Fed. Rep. of Germany |
| 3136468 | 3/1983 | Fed. Rep. of Germany |
| 3327253 | 2/1984 | Fed. Rep. of Germany |
| 2019134 | 10/1979 | United Kingdom |
| 2100025 | 12/1982 | United Kingdom |

Primary Examiner—Bruce A. Reynolds
Assistant Examiner—John A. Jeffery
Attorney, Agent, or Firm—Seed and Berry

[57] ABSTRACT

A circuit is provided for activating a heating element to deice a lock cylinder of a door system. A handle switch is coupled to a door handle of the door system and is constructed to provide a signal when the door handle is moved in an unlatching position. The handle switch provides the signal so long as the door handle is in the unlatching position. The activator circuit measures the time that the door handle is in the unlatching position and, after the door handle has been in the unlatching position for a predetermined time interval, begins to provide electrical energy to the heating element. The activator circuit measures the time period that electrical energy is provided to the heating element and, after a predetermined interval, discontinues providing electrical energy to the heating element.

20 Claims, 4 Drawing Sheets

METHOD AND APPARATUS FOR HEATING THE CYLINDER OF A VEHICLE DOOR LOCK UTILIZING TIMING MEANS

TECHNICAL FIELD OF THE INVENTION

The present invention is directed in general toward a circuit for energizing a heater element at the lock cylinder in a door of a truck or other vehicle and, more particularly, toward a circuit for selectively energizing the heating element for a predetermined time interval.

BACKGROUND OF THE INVENTION

Most automobiles and trucks (herein vehicles) include a lock positioned at or near a door to prevent unauthorized entry into the riding compartment of the vehicle. The lock is typically positioned on the exterior frame of the vehicle for access by the operator of the vehicle. A key is usually provided for engaging a cylinder for unlocking the lock. The door may also include a latch and a handle so that, once unlocked, the handle may be used to unlatch the door and permit opening of the door for entry into the riding compartment of the vehicle.

During freezing weather conditions such as snow, freezing rain, or ice, the lock cylinder may become frozen, thereby prohibiting the operator from unlocking the lock to gain entry to the vehicle. To enable the operator to gain access to the vehicle, prior art devices have been proposed for heating the lock thereby to melt the ice and permit engagement of the lock with the key. These devices typically provide a heating element that is positioned proximate the cylinder for heating the cylinder to remove any ice that has accumulated therein, so that the key may be engaged with the cylinder to unlock the lock. However, these prior art devices include controls for energizing the heating element that suffers from one or more of the following disadvantages.

Some prior art controls for energizing the heating element include devices that activate the heating element immediately upon movement of the door handle in a predetermined position (referred to as the deicing position). These devices require that the door handle be positionable in at least three positions, i.e., the normal position, the unlatching position, and the deicing position. However, providing a door handle that is movable in at least three positions is costly and therefore undesirable. When this energizing circuitry is used with a door handle that is movable in only two positions, i.e., the normal position and the unlatching position, so that the unlatching position is the deicing position, then the heating element is activated each time the door is opened thereby causing unnecessary waste of energy and, accordingly, being undesirable.

Other prior art devices disclose an external switch, positioned on the exterior of the vehicle, for activating the heating element. However, these devices require the external switch to be bulky and cumbersome so that it does not freeze. Accordingly, these devices are not effective when used with small switches and are expensive when used with switches that will not freeze. Still another device provides exterior contacts that the operator is to bridge using a conductive element to activate the heating element. These devices, in addition to being cumbersome to use, are somewhat dangerous in that the operator may be exposed to a potential difference between the exterior conductors and ground. Accordingly, it is desirable to provide a heating element for a lock cylinder of a vehicle that may be energized using a simple and inexpensive method and apparatus.

Still further, prior art devices for activating a heating element fail to provide an effective method or apparatus for terminating energy to the heating element after a time has elapsed to allow deicing. As an example, one prior art device enables the heating element to be activated so long as the door handle is in a predetermined position. This device requires the operator to continually monitor the lock cylinder to determine when the cylinder has adequately deiced. Accordingly, it is desirable to provide a method and apparatus for energizing a heating element for a lock cylinder and for terminating battery energy to the heating element after sufficient time has elapsed for deicing.

SUMMARY OF THE INVENTION

The present invention provides a circuit for activating a heating element for heating the lock cylinder of a door. The door includes a handle for pivoting a latch assembly of a door to open the door. The handle is movable between a normal position and an unlatching position. The circuit includes a handle switch for providing a handle position signal in first and second states. The handle switch is constructed to provide the handle position signal in the second state at times when the handle is in the unlatching position. The circuit also includes a delay module that is responsive to the second state of the handle position signal for providing a heat signal. The delay module is constructed to provide the heat signal after the handle position signal has been in the second state for a first predetermined time interval. The heating element is responsive to the heat signal to heat the lock cylinder.

In operation, the operator moves the handle to the unlatching position and maintains the handle in the unlatching position for the first predetermined time interval. The circuit of the invention measures the time interval that the handle is in the unlatching position. The circuit starts to energize the heating element after the handle has been in the unlatching position for more than the first predetermined time interval.

In an alternative embodiment of the invention, the delay module provides activating electricity to the heating element for a second predetermined time interval. The delay is constructed to automatically stop providing the activating electricity after the second predetermined time interval has elapsed. Both the first and second predetermined time intervals may be selected by the operator in other alternative embodiments of the invention.

DETAILED DESCRIPTION OF THE INVENTION

Figure 1:
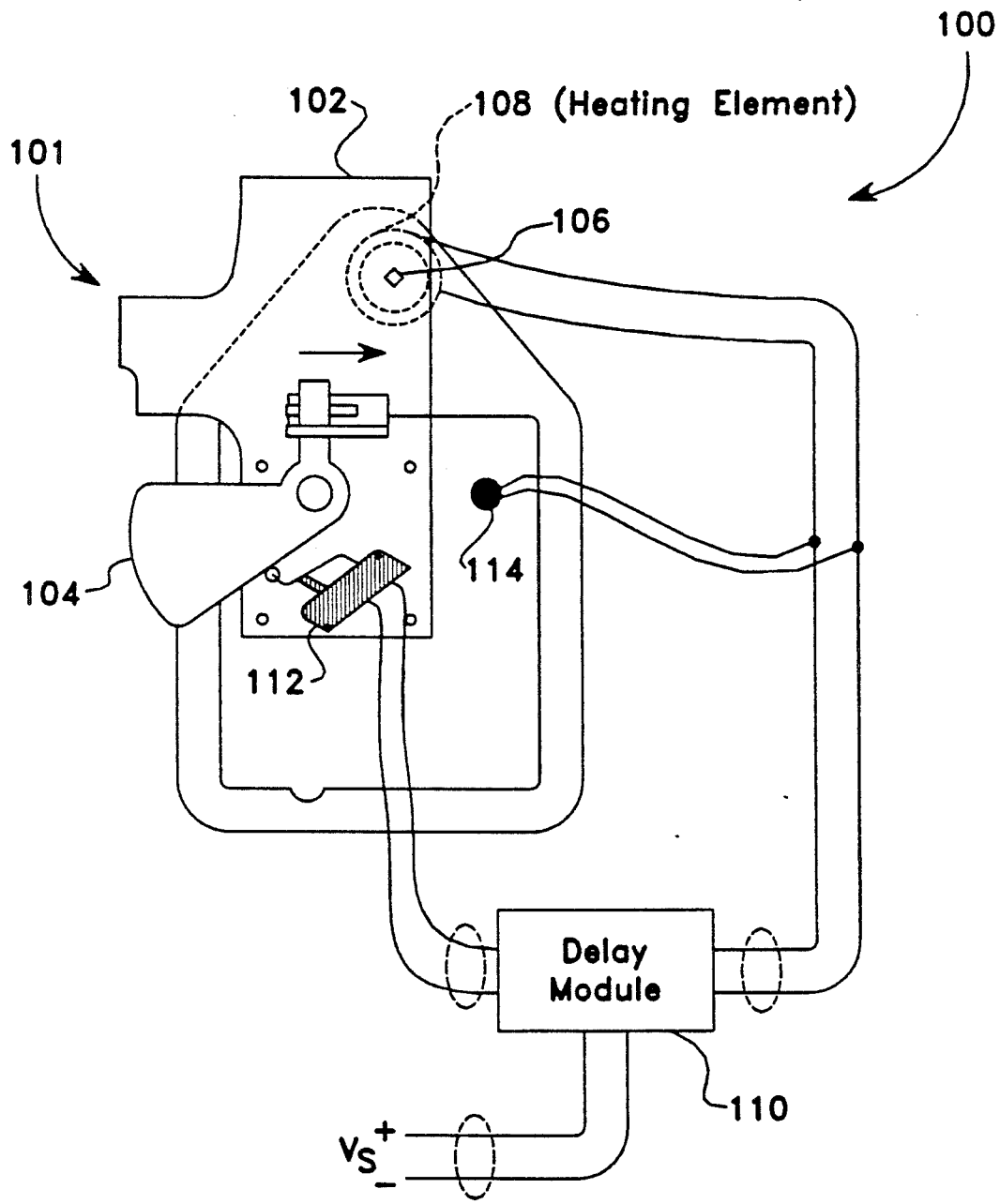
FIG. 1 is an illustrative diagram of the subject circuit coupled to a door handle and lock cylinder of a vehicle.

A door system 100, illustrated in FIG. 1, is provided for enabling selective entry to the cab of a vehicle (not shown). The door system 100 includes a handle assembly 101 for permitting an operator of the vehicle to open a door (not shown). The handle assembly 101 includes a handle 102 and a bell crank 104 wherein the handle 102 is operable by the operator of the vehicle to pivot the bell crank 104 to enable the door (not shown) of the vehicle to be opened by the operator. The handle 102 illustrated in FIG. 1 may be moved between a normal position and an unlatching position by the operator. Movement of the handle 102 causes the bell crank 104 to be pivoted from a normal position to an unlatching, thereby defining a normal state and an unlatching state for the handle assembly 101. As is known in the art, a latch assembly (not shown) is actuated by the pivotal movement of the bell crank 104 to unlatch the door (not shown) under certain circumstances. Typically, the handle 102 is spring biased in the normal position so that when the handle 102 is released by the operator, the handle 102 and bell crank 104 return to the normal position.

The door system 100 also includes a lock cylinder 106 that is constructed to mate with a key (not shown) for unlocking and locking the door system 100. The lock cylinder 106 may be set in a locked state or an unlocked state by the key (not shown). As is known in the art, when the lock cylinder 106 is set in the unlocked state, movement of the bell crank 104 from the normal position to the unlatching position will actuate the bell crank 104 (not shown) thereby unlatching the door (not shown) for opening of the door. As is further known in the art, when the lock cylinder 106 is set in the locked state by the key (not shown), movement of the bell crank 104 from the normal position to the unlatching position will not actuate the bell crank 104 (not shown) to unlatch the door. Accordingly, movement of the bell crank 104 from the normal position to the unlatching position actuates the bell crank 104 (not shown) only when the lock cylinder 106 is set in the unlocked state. Many devices suitable for use as the lock cylinder 106 are readily known and available to those skilled in the art.

In accordance with the present invention, the door system 100 includes apparatus for heating the lock cylinder 106 to deice the lock cylinder under extreme weather conditions such as snow, freezing rain, etc. Accordingly, a heating element 108 is positioned proximate the lock cylinder 106 for selectively heating the lock cylinder 106 to deice the lock cylinder. The heating element 108 is preferably an electrically conducting heating element wrapped in a coil around the lock cylinder 106. The heating element may be constructed to dissipate approximately 20 watts of power for heating the lock cylinder 106. However, those skilled in the art will appreciate that many other constructions and devices may be provided for the heating element 108 without departing from the true scope and spirit of the present invention.

A delay module 110 is provided for selectively energizing the heating element 108 for deicing of the lock cylinder 106. The delay module 110 receives a handle position signal from a handle switch 112. The handle switch 112 is constructed to provide the handle position signal in first and second states. The handle switch 112 is positioned proximate the handle assembly 101 and is responsive to movement of the bell crank 104 for providing the handle position signal. In the presently preferred embodiment of the invention, the handle position signal is provided in a first state when the bell crank 104 is in its normal position. The handle switch 112 is constructed for providing the handle position signal in a second state when the bell crank 104 is in the unlatching position. The handle switch 112 may comprise any of a variety of switches commonly available for performing this function. As an example, the handle switch 112 may comprise a simple two-position switch for disconnecting two inputs to the handle switch 112 when the bell crank 104 is in its normal position and for connecting two inputs to the handle switch 112 when the bell crank 104 is in the unlatching position. Many other switches and arrangements may be used for the handle switch 112 for providing the handle position signal in at least first and second states.

Although the handle switch 112 is described herein as responding to the movement of the bell crank 104 for providing the handle position signal in the first and second states, those skilled in the art will appreciate that any construction for providing the handle position signal in the first and second states in response to positioning of the handle assembly in the normal and unlatching states, respectively, may be substituted therefor. In the presently preferred embodiment of the invention, the handle switch 112 is constructed to respond to pivotal movement of the bell crank 104 so that the handle switch 112 may be positioned in a protected portion of the door (not shown).

The delay module 110 is also coupled to a source of voltage $V_S$ for selectively providing the source of voltage to the heating element 108. In the presently preferred embodiment of the invention, the source of voltage $V_S$ is equal to the voltage readily available from the vehicle battery, e.g., 12 volts. However, many other sources of energy may be selectively provided to the heating element 108 in accordance with the subject invention.

The delay module 110 is constructed to respond to the second state of the handle position signal for coupling the source of voltage $V_S$ to the heating element 108 thereby to energize the heating element 108. More particularly, the delay module 110 is constructed to measure the amount of time that the handle position signal is provided in the second state and to couple the source of voltage $V_S$ to the heating element 108 only after the handle position signal has been provided in the second state for a first predetermined time interval. Additionally, the delay module 110 is constructed to couple the source of voltage $V_S$ to the heating element 108 for an amount of time equal to a second predetermined time interval so that electricity is automatically decoupled from the heating element 108 upon elapse of the second predetermined time interval, even though the handle 102 is released to the normal position prior to elapse of the second predetermined time interval.

A light-emitting diode 114 is coupled to the delay module 110 for receiving electrical energy provided to the heating element 108. The light-emitting diode 114 is positioned on the vehicle (not shown) for providing visual feedback to the operator that the heating element is energized and heating the lock cylinder. Those skilled in the art will appreciate that the light-emitting diode 114 may be located anywhere on or in the vehicle to provide an indication to the operator that the lock cylinder 106 is being heated by the heating element 108. Further, although the invention is described herein by reference to a light-emitting diode 114 for providing visual feedback to the operator, any device for providing an indication to the operator that the lock cylinder 106 is being heated by the heating element 108 may be substituted therefore, e.g., a beeper or other audio indicator.

In operation, the operator of the vehicle moves the handle 102 to the unlatching position and holds the handle 102 in that position for an amount of time equal to the first predetermined time interval. The handle switch 112 provides the handle position signal in the second state to the delay module 110 for the entire duration of time that the handle 102 is maintained in the unlatching position by the operator. After the handle 102 has been in the unlatching position for a time equal to the first predetermined time interval, the delay module 110 couples the source of voltage $V_S$ to the heating element 108. At that time, the light-emitting diode 114 is illuminated thereby providing visual feedback to the operator that the lock cylinder 106 is being heated so that the operator may release the handle 102. The delay module 110 continues providing electrical energy to the heating element 108 for an amount of time equal to the second predetermined time interval. After elapse of the second predetermined time interval, the delay module 110 stops providing the source of electrical energy $V_S$ to the heating element 108. The light-emitting diode 114 will go off thereby indicating to the operator that the heating period has terminated. The operator can again attempt to engage the lock cylinder 106 with the key (not shown) and, if additional deicing is necessary, may repeat the process.

Figure 2:
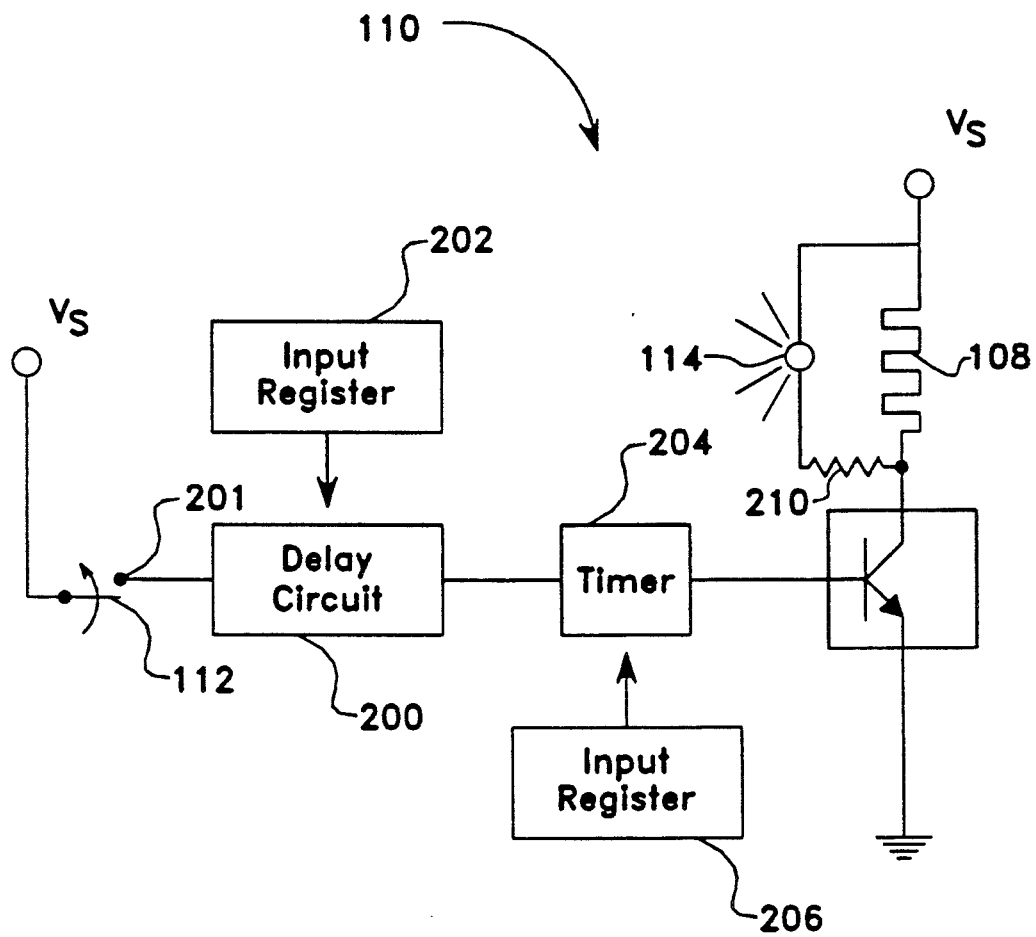
FIG. 2 is an illustrative block diagram of the circuit that is the subject of the present invention.

With reference to FIG. 2, a more detailed illustrative block diagram of the delay module 110 is provided. Therein, the handle switch 112 is shown to receive the source of voltage $V_S$. The handle switch 112 is coupled to an input node 201 of the delay module 110. The input node 201 is coupled to a delay circuit 200 of the delay module 110. The handle switch 112 is normally open so that when the handle 102 is in the normal position, the input node 201 is discharged to zero volts by the delay circuit 200, as will be described in more detail below. When the handle 102 is moved to the unlatching position, the handle switch 112 is closed thereby coupling the voltage source $V_S$ to the delay circuit 200. Accordingly, the first state of the handle position signal is equal to zero volts and the second state of the handle position signal is equal to the voltage source $V_S$.

The delay circuit 200 is provided for measuring the time interval that the handle switch 112 is in the closed position, i.e., the handle position signal is provided in the second state. The delay circuit 200 receives a first time reference value from an input register 202 wherein the first time reference value is indicative of the first predetermined time interval. The delay circuit 200 compares the time that the handle position signal is provided in the second state with the first time reference value provided by the input register 202 and, when the time that the handle position signal is in the second state exceeds the value of the first time reference value, then the delay circuit 200 provides a trigger signal to a timer 204. The input register 202 may comprise any device, or combination of devices, for receiving a first time reference value from the manufacturer or operator of the delay module 110. As an example, the input register 202 may comprise read only memory programmed at the factory by the manufacturer which determines the value of the first time reference value. Alternatively, the input register 202 may comprise programmable memory and apparatus constructed for enabling either the manufacturer or operator to provide a programmable time signal thereby to permit variation of the first predetermined time interval. The delay circuit 200 may comprise any device, or combination of devices, for measuring the time period that the handle position signal is provided in the second state and for comparing this measured time interval to the first time reference value from the input register 202. It will be readily apparent to those skilled in the art that both the delay circuit 200 and the input register 202 may be constructed from a variety of digital devices readily available in the art such as, for example, timers, comparators, latches, memory devices, etc. Alternatively, the delay circuit 200 and input register 202 may be constructed from analog circuit devices, as will be described in more detail below by reference to FIGS. 3A and 3B. As a further alternative, a combination of analog and digital devices may be provided to construct the delay circuit 200 and/or the input register 202.

The timer 204 is coupled to receive a second time reference value from an input register 206. Like the input register 202, the input register 206 is provided for receiving a second time reference value from the manufacturer or operator of the delay module 110. The input register 206 may comprise any device, or combination of devices, either analog, digital, or both, for enabling the manufacturer and/or operator to provide a fixed or variable time reference value so that the second predetermined time interval may be either fixed or variable, respectively. The timer 204 is responsive to the trigger signal received from the delay circuit 200 for providing a heat signal to activate a driver circuit 208. The timer 204 is constructed to provide the heat signal for a time interval corresponding to the second time reference value provided by the input register 206. Accordingly, the timer 204 is constructed to measure the time interval that the heat signal is provided and, when the time interval exceeds the value of the second time reference value from the input register 206, to terminate the heat signal thereby to terminate heating of the heating element 108. The timer 204, like the input registers and delay circuit, may comprise either digital, analog, and/or a combination of digital and analog circuitry.

The driver circuit 208 is responsive to the heat signal for coupling the voltage source $V_S$ to the heating element 108 and the light-emitting diode 114. A resistor 210 is coupled intermediate the light-emitting diode 114 to limit the current conducted by the diode 114 so that the diode will not overheat and open circuit. Accordingly, after the trigger signal is provided to the timer 204 by the delay circuit 200, the timer 204 provides the heat signal to the driver 208 so that the heating element 108 is energized to heat and deice the lock cylinder 106. The heat signal is provided for a time period equal to the second predetermined time interval and subsequently terminated by the timer 204.

Figure 3A:
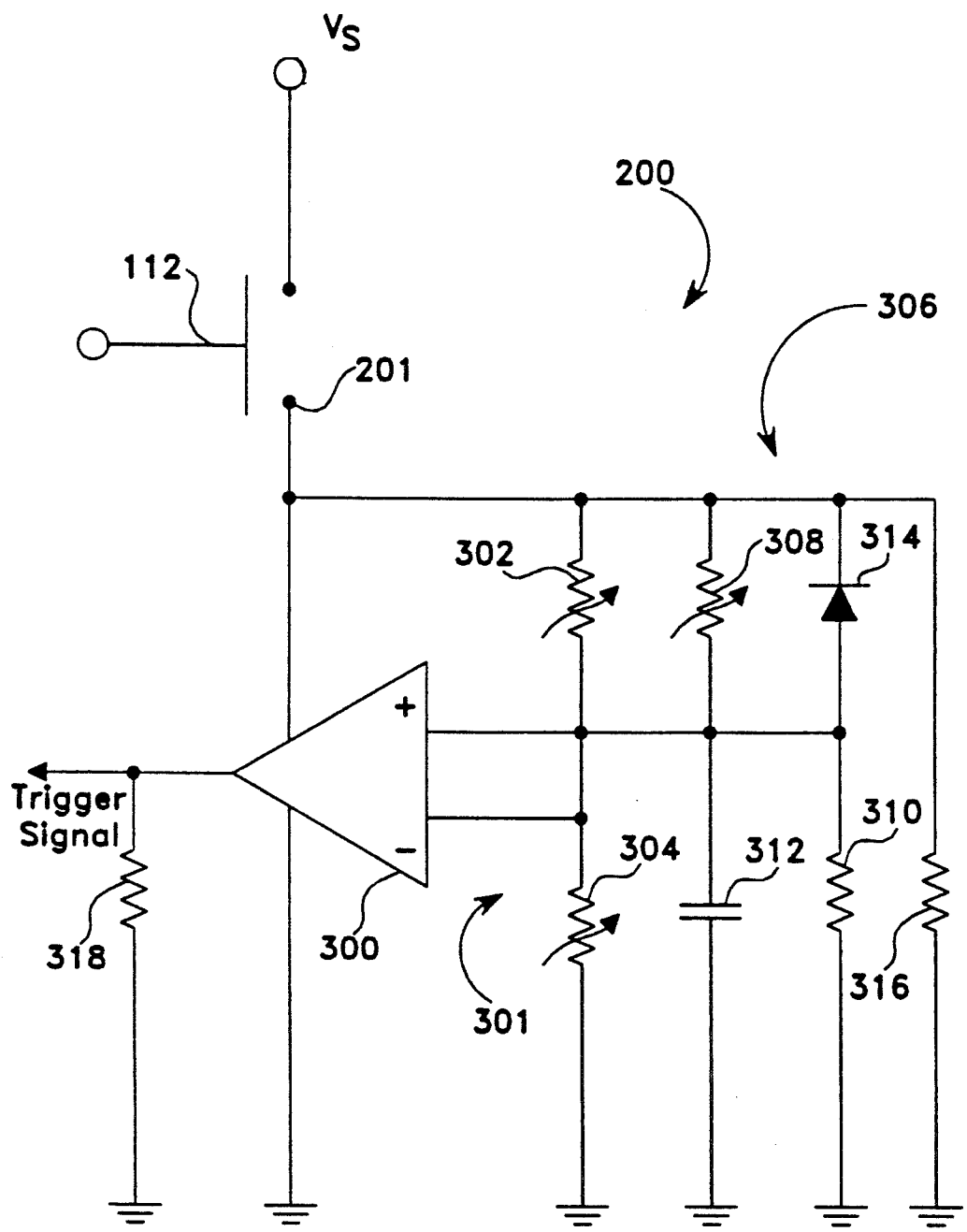
FIGS. 3A and 3B are more detailed illustrative block diagrams of the circuit that is the subject of the present invention.

With reference to FIG. 3A, a more detailed illustrative diagram of a presently preferred embodiment of the delay circuit 200 is provided. Therein, the handle switch 112 is constructed to couple the source of voltage $V_S$ to the input node 201 and an operational amplifier 300 of the delay circuit 200. The operational amplifier 300 may comprise any of a variety of devices for comparing the voltage present at a first noninverting input to the voltage present at a second inverting input. The output of the operational amplifier 300 is provided in a first state if the voltage of the noninverting input exceeds the voltage of the inverting input and is provided in a second state if the voltage of the inverting input exceeds the voltage of the noninverting input. Such operational amplifiers are well known in the art.

The operational amplifier 300 has its inverted input coupled to a voltage divider 301 comprised of resistors 302 and 304. The value of the resistors 302 and 304 determine in part the first predetermined time interval, as will be described in more detail below. Also, the resistors 302 and 304 may comprise one or more variable resistors thereby enabling the manufacturer or operator of the delay circuit 200 to vary the relative values of the resistors 302 and 304 and thereby vary the value of the first predetermined time interval, as also will be described in more detail below.

The noninverting input of the operational amplifier 300 is coupled to a time measurement circuit 306 that includes a resistor 308, a resistor 310 and a capacitor 312. The value of the resistors 308 and 310 in combination with the value of the capacitor 312 determine the rate at which the capacitor charges when the handle switch 112 couples the voltage source $V_s$ to the input node 201. Additionally, the relative values of the resistors 308 and 310 are selected to limit the value to which the capacitor 312 charges while insuring that the capacitor will charge to a value greater than that provided to the inverting input of the operational amplifier 300 by the voltage divider 301. Accordingly, the values of the resistors 308 and 310 and the value of the capacitor 312 may also be varied to vary the value of the first predetermined time interval.

A diode 314 and resistor 316 are provided for discharging the capacitor 312 when the handle switch 112 returns to the normal position, i.e., when the handle 102 is released. The resistor 316 is preferably chosen to have a relatively low value to enable the capacitor 312 to discharge quickly so that if the handle 102 is subsequently moved to the unlatching position, it must be maintained in the unlatching position for a time period equal to the first predetermined time period before a trigger signal is provided.

A resistor 318 is provided at the output of the operational amplifier 300 to reduce the impedance of the operational amplifier output so that noise at the output of the operational amplifier will not appear as a trigger signal to the timer 204.

In operation, when the handle switch 112 is closed, i.e., the handle is moved to the unlatching position, the voltage source $V_s$ is coupled to the input node 201 thereby providing the handle position signal in the second state. Initially, the voltage provided to the inverted input of the operational amplifier 300 by the voltage divider 301 is greater than the voltage provided to the noninverted input by the capacitor 312 so that the output of the operational amplifier, i.e., the trigger signal, is equal to zero volts. Immediately after the handle switch 112 is closed, the capacitor 312 begins to charge. When the voltage across the capacitor 312 exceeds the voltage across the resistor 304, the output of the operational amplifier will change to a high value, equal to the voltage across the resistor 316, so that the trigger signal is provided to the timer 204. After the light-emitting diode 114 is illuminated and the operator releases the handle 102, the capacitor 312 will quickly discharge to zero volts so that another trigger signal will only be provided if the handle 102 is again held in the unlatching position for a time period equal to the first predetermined time interval.

Figure 3B:
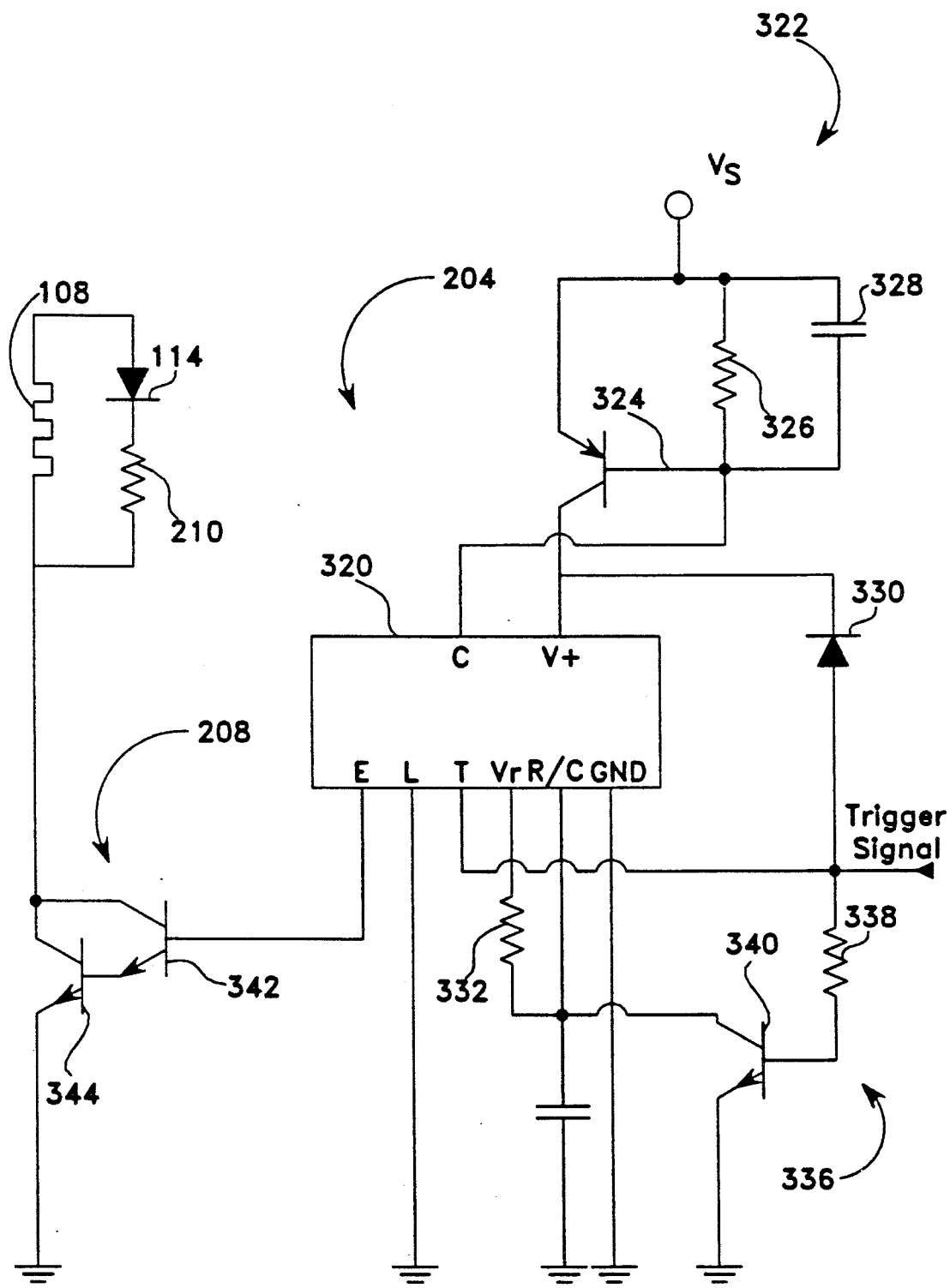

With reference to FIG. 3B, a more detailed schematic diagram of a presently preferred embodiment for the timer 204 is provided. The timer 204 comprises a semiconductor circuit 320 that is constructed for providing the heat signal for the second predetermined time interval. The semiconductor circuit 320 is responsive to the trigger signal coupled to a trigger input T for providing the heat signal at an emitter output E. In the presently preferred embodiment of the invention, the semiconductor circuit 320 comprises an LM322 precision timer as available from the National Semiconductor Corporation.

A source circuit 322 is constructed for selectively providing the voltage source $V_s$ to the semiconductor circuit 320. The source circuit 322 includes a transistor 324, a resistor 326, a capacitor 328 and a diode 330. The diode 330 is connected for coupling the trigger signal to the source voltage of the semiconductor circuit 320 for temporarily energizing the semiconductor circuit. The trigger signal is also coupled to the trigger input T of the semiconductor circuit 320. Once triggered, the semiconductor circuit 320 will begin providing the heat signal output. As such, a transistor internal to the semiconductor circuit 320 having a collector input C will draw current from the resistor 326 and the voltage source $V_s$. The voltage drop across the resistor 326 will cause the transistor 324 to conduct thereby providing the voltage source $V_s$ to the semiconductor circuit 320. As mentioned above, after the heat signal is provided, the diode 114 will be illuminated thus indicating to the user that the handle may be released. After the handle is released, the delay circuit 200 will reset the trigger signal to zero so that the diode 330 will decouple the source circuit 322 from the trigger signal. After the semiconductor circuit 320 terminates the heat signal, the transistor internal to the semiconductor circuit 320 will stop conducting so that no voltage is dropped across the resistor 326 and the transistor 324 will stop conducting, effectively disconnecting the voltage source $V_s$ from the semiconductor circuit 320.

The timer 204 also includes a resistor 332 and a capacitor 334 that are coupled to the semiconductor circuit 320 for providing a time constant that determines the time interval that the heat signal is provided at the output of the semiconductor circuit, i.e., the emitter E of the transistor internal to the semiconductor circuit 320. Accordingly, the value of the resistor 332 and the capacitor 334 determine the value of the second predetermined time interval. Furthermore, the value of the resistor 332 may be varied to vary the value of the second predetermined time interval.

A novel reset circuit 336 includes a resistor 338 and a transistor 340. As is known to those skilled in the art, the semiconductor circuit 320 terminates its output pulse, i.e., the heat signal, when the voltage of the R/C input to the semiconductor circuit 320 is approximately equal to 2.0 volts. Subsequent trigger pulses assume that the capacitor 334 is completely discharged so that the heat signal from the semiconductor circuit 320 will have the appropriate pulse width. In order to ensure that the capacitor 334 is discharged, the resistor 338 is connected to couple the trigger signal to the base of the transistor 340 so that the transistor 340 will conduct electricity to discharge the capacitor 334.

In operation, when the trigger signal is provided the transistor 340 conducts to discharge the capacitor 334. After the heat signal is provided by the semiconductor circuit 320 and the light-emitting diode 114 is illuminated, the operator will release the handle 102 thereby terminating the trigger signal and turning the transistor 340 off so that the capacitor 334 is permitted to charge. In the presently preferred embodiment for the timer 204, as described by reference to FIG. 3B, the second predetermined time interval is measured from the end of the trigger signal. However, it will be readily apparent to those skilled in the art how the timer 204 could be designed so that the second predetermined time interval is measured from the beginning of the trigger signal.

The heat signal from the semiconductor circuit 320 is provided to the driver 208 for driving the source voltage $V_s$ through the heating element 108. In the presently preferred embodiment of the invention, the driver 208 is constructed from a pair of transistors 342 and 344 connected in a Darlington pair. However, those skilled in the art will appreciate that a wide variety of devices may be provided for the driver 208.

Those skilled in the art will further appreciate that the first predetermined time interval may be adjusted by providing a variable resistance for the voltage divider 301 such as, for example, a slider coupled to the inverting input of the operational amplifier 300. Alternatively, one or both of the resistors 302 and 304 may be made variable to permit variation in the first predetermined time interval. As still another alternative, the resistor 308 may be made variable to permit variation in the first predetermined time period. Similarly, the resistor 332 may be made variable so that the second predetermined time period can be increased or decreased by a user.

It will be appreciated that, although specific embodiments of the invention have been described herein for purposes of illustration, various modifications may be made without departing from the true spirit and scope of the invention. Accordingly, the invention is not limited except as by the appended claims.

I claim:

1. A circuit for activating a heating element for heating the lock cylinder of a door wherein the door includes a handle for releasing a latch of the door to open the door, the handle being movable between first and second positions, said circuit comprising:
    switch means for providing a handle position signal in first and second states, said switch means being constructed to provide said handle position signal in said second state at times when the handle is in the second position; and
    delay module means responsive to the second state of said handle position signal for providing a heat signal wherein the heating element is responsive to said heat signal to heat the lock cylinder, said delay module means being constructed to provide said heat signal after said handle position signal has been continuously in the second state for a first predetermined time interval.

2. The circuit as recited in claim 1 wherein said delay module means comprises:
    delay means for measuring the time interval that said handle position signal is provided in the second state and for providing a trigger signal when the measured time interval exceeds the first predetermined time interval; and
    timer means responsive to said trigger signal for providing said heat signal, said timer means being constructed to provide said heat signal for a second predetermined time interval.

3. The circuit as recited in claim 1, further comprising interval selection means for enabling a user to select the first predetermined time interval.

4. The circuit as recited in claim 2, further comprising selection means for enabling a user to select the first and second predetermined time intervals.

5. The circuit as recited in claim 1, further comprising indicator means responsive to said heat signal for indicating that the heating element is heating the lock cylinder.

6. The circuit as recited in claim 2 wherein said delay means comprises:
    time measurement means responsive to said handle position signal for providing a time signal wherein the value of said time signal is indicative of the time interval that said handle position signal is in the second state;
    reference means for providing a reference signal wherein the value of said reference signal is indicative of the value of said first predetermined time interval; and
    comparator means for providing said trigger signal when the value of said time signal exceeds the value of said reference signal.

7. The circuit as recited in claim 6 wherein said reference means comprises first and second resistors serially coupled intermediate said switch means and a reference potential for receiving said handle position signal so that a reference node intermediate said first and second resistors provides said reference signal.

8. The circuit as recited in claim 7, further comprising means for varying the relative values of said first and second resistors for enabling a user to select the first predetermined time interval.

9. The circuit as recited in claim 6 wherein said time measurement means comprises a resistor and a capacitor serially coupled intermediate said switch means and a reference potential for receiving said handle position signal so that a time node intermediate said resistor and said capacitor provides said time signal.

10. The circuit as recited in claim 9, further comprising means for varying the value of said resistor for selecting the time rate of change of the value of said time signal.

11. The circuit as recited in claim 2 wherein said delay means comprises:
    a resistor and a capacitor serially coupled intermediate said switch means and a reference potential for receiving said handle position signal so that a time node intermediate said resistor and said capacitor provides a time signal wherein the value of said time signal is indicative of the time interval that said handle position signal is in the second state;
    first and second reference resistors serially coupled intermediate said switch means and a reference potential for receiving said handle position signal so that a reference node intermediate said first and second reference resistors provides a reference signal wherein the value of said reference signal is indicative of the value of said first predetermined time interval; and
    comparator means for providing said heat signal when the value of said time signal exceeds the value of said reference signal.

12. The circuit as recited in claim 2 wherein said timer means comprises:
    circuit means responsive to said trigger signal for providing said heat signal and a reference signal; and
    time measurement means responsive to said reference signal for providing a time signal, said circuit means being constructed to terminate said heat signal when the value of said time signal is equal to a predetermined fraction of the value of said reference signal.

13. The circuit as recited in claim 12 wherein said time measurement means comprises a resistor and a capacitor serially coupled intermediate said circuit means and a reference potential for receiving said reference signal so that a time node intermediate said resistor and said capacitor provides said time signal.

14. The circuit as recited in claim 13, further comprising means for varying the value of said resistor for selecting the time rate of change of the value of said time signal.

15. The circuit as recited in claim 13, further comprising reset means responsive to said trigger signal for discharging said capacitor.

16. The circuit as recited in claim 15 wherein said reset means comprises:
   a resistor having first and second leads wherein said first lead is coupled to receive said trigger signal; and
   transistor means for discharging said capacitor, said transistor means having a base input and an emitter to collector path, said second lead of said resistor being coupled to said base input and said emitter to collector path being coupled in parallel with said capacitor.

17. The circuit as recited in claim 1 wherein said delay module means comprises:
   a delay resistor and a delay capacitor serially coupled intermediate said switch means and a reference potential for receiving said handle position signal so that a first time node intermediate said delay resistor and said delay capacitor provides a first time signal;
   first and second reference resistors serially coupled intermediate said switch means and the reference potential for receiving said handle position signal so that a first reference node intermediate said first and second resistors provides a first reference signal;
   comparator means for providing a trigger signal when the value of said first time signal exceeds the value of said first reference signal;
   circuit means responsive to said trigger signal for providing said heat signal and a second reference signal; and
   a time resistor and a time capacitor serially coupled intermediate said circuit means and the reference potential for receiving said second reference signal so that a second time node intermediate said time resistor and said time capacitor provides a second time signal, said circuit means being constructed to terminate said heat signal when the value of said second time signal is equal to a predetermined fraction of the value of said second reference signal.

18. The circuit as recited in claim 17, further comprising:
   a reset resistor having first and second leads wherein said first lead is coupled to receive said trigger signal; and
   transistor means for discharging said time capacitor, said transistor means having a base input and an emitter to collector path, said second lead of said reset resistor being coupled to said base input and said emitter to collector path being coupled in parallel with said capacitor.

19. A door lock for preventing release of a door latch to prevent opening of a door, said door lock comprising:
   lock cylinder means for preventing release of the door latch, said lock cylinder means being responsive to a mating key for positioning said lock cylinder means in first and second states wherein release of the door latch is permitted in said first state and is prevented in said second state;
   handle means operable by a user for releasing the door latch to open the door, said handle means being mounted for pivotal rotation between first and second positions, said handle means being responsive to said first state of said lock cylinder means for releasing the door latch so that pivotal rotation of said handle means from said first position to said second position opens said door;
   switch means for providing a handle position signal wherein said handle position signal has first and second states, said switch means being constructed to provide said handle position signal in said first state when said handle means is in said first position and to provide said handle position signal in said second state when said handle means is in said second position;
   delay means responsive to said second state of said handle position signal for providing a trigger signal, said delay means including first time interval means for providing a first time signal indicative of the time interval that said handle position signal is in said second state, said delay means further including comparator means responsive to said first time signal for providing said trigger signal when the time interval that said handle means is in said second position exceeds a first predetermined time interval;
   timer means for providing a heat signal in first and second states, said timer means being responsive to said trigger signal for providing said heat signal in a second state for a second predetermined time interval; and
   heating means responsive to said second state of said heat signal for providing heat to said lock cylinder means thereby to heat and defrost said lock cylinder means to enable the position of said lock cylinder means to be changed from said second state to said first state.

20. A method for energizing the heating element of a lock cylinder of a door wherein the door includes a handle positionable in at least first and second positions, said method comprising the steps of:
   measuring the time interval that the handle is continuously in the first position;
   starting to energize the heating element after the handle has been continuously in the first position for more than a first predetermined time interval; and
   stopping energy to the heating element after a second predetermined time after energy is first provided to the heating element.

* * * * *